US009211651B2

(12) United States Patent
Xydis et al.

(10) Patent No.: US 9,211,651 B2
(45) Date of Patent: Dec. 15, 2015

(54) SLICING GUIDE

(71) Applicant: HELEN OF TROY LIMITED, Belleville, St. Michael (BB)

(72) Inventors: Christopher R. Xydis, New York, NY (US); Carly Brush, Weston, MA (US); Mark Steven Drayer, Manhattan, NY (US); Mackenzie Mor, New York, NY (US); Paul Katz, Palo Alto, CA (US)

(73) Assignee: Helen of Troy Limited, Belleville, St. Michael (BB)

( * ) Notice: Subject to any disclaimer, the term of this patent is extended or adjusted under 35 U.S.C. 154(b) by 84 days.

(21) Appl. No.: 14/200,980

(22) Filed: Mar. 7, 2014

(65) Prior Publication Data

US 2015/0251328 A1 Sep. 10, 2015

(51) Int. Cl.
*B23Q 3/00* (2006.01)
*B26B 29/06* (2006.01)

(52) U.S. Cl.
CPC .................................... *B26B 29/063* (2013.01)

(58) Field of Classification Search
USPC .................................. 269/29, 87.2, 288, 295
See application file for complete search history.

(56) References Cited

U.S. PATENT DOCUMENTS

| | | | | |
|---|---|---|---|---|
| 3,583,026 A * | 6/1971 | Peoni | 452/16 |
| 4,580,343 A | 4/1986 | Bell, Jr. | |
| 4,948,106 A | 8/1990 | Popeil et al. | |
| 6,058,829 A | 5/2000 | Endres | |
| 6,128,996 A * | 10/2000 | Sato et al. | 83/765 |
| 6,202,529 B1 * | 3/2001 | Hodsdon | 83/870 |
| 7,007,583 B1 * | 3/2006 | Fiola | 83/870 |
| 8,474,359 B2 | 7/2013 | George | |

* cited by examiner

*Primary Examiner* — Lee D Wilson
*Assistant Examiner* — Shantese McDonald
(74) *Attorney, Agent, or Firm* — Rankin, Hill & Clark LLP

(57) ABSTRACT

A slicing guide includes a shell including a first side wall and an opposing second side wall, a first door received in the shell between the first side wall and a second side wall, and a base or spring connected with the shell. The base, the spring or the shell biases or urges the first door toward the second side wall.

20 Claims, 5 Drawing Sheets

SLICING GUIDE

BACKGROUND

Slicing guides are known to make the operation of slicing food easier. For example, U.S. Pat. No. 6,128,996 discloses a slicing guide which operates as a food holder to aid in slicing a bagel.

Known slicing guides that are useful with slicing bread products, such as bagels, are typically not conducive when it is desired to slice multiple food items. For example, when it is desired to slice multiple small fruits, these small fruits may have different shapes and diameters making it difficult to use a slicing device similar to that disclosed in U.S. Pat. No. 6,128,996.

SUMMARY

In view of the foregoing, a slicing guide is provided that can be useful for slicing multiple items, such as multiple small fruits (e.g., grapes, cherry tomatoes, pitted cherries and olives). Such a slicing guide can be useful to slice other items as well and is not limited to only small fruits.

An example of such a slicing guide includes a shell including a first side wall and an opposing second side wall, a first door received in the shell between the first side wall and the second side wall, and a base connected with the shell. The shell includes a slot positioned between the first side wall and the second side wall for receiving a knife. The first door is moveable relative to the shell. At least one of the base and the shell includes a downwardly sloped surface sloped downwardly from the first side wall in a direction toward the slot. The first door cooperates with the downwardly sloped surface so as to urge a lower end of the first door in the direction toward the slot when resting on the downwardly sloped surface.

Another example of a slicing guide includes a shell including a first side wall and an opposing second side wall, a first door received in the shell between the first side wall and the second side wall, and a first spring contacting the first side wall of the shell and the first door. The first spring urges the first door in a direction toward the second side wall. The shell includes a slot positioned between the first side wall and the second side wall for receiving a knife. The first door is moveable relative to the shell. The first door is also moveable relative to a distal end of the first spring.

Another example of a slicing guide includes a shell including a first side wall and an opposing second side wall, a first door removably received in the shell between the first side wall and the second side wall, and a first spring contacting the first side wall of the shell and the first door. The shell includes a slot positioned between the first side wall and the second side wall for receiving a knife. The first door is moveable relative to the shell when received in the shell. The first spring urges the first door in a direction toward the second side wall when the first door is received in the shell.

DETAILED DESCRIPTION

Figure 1:
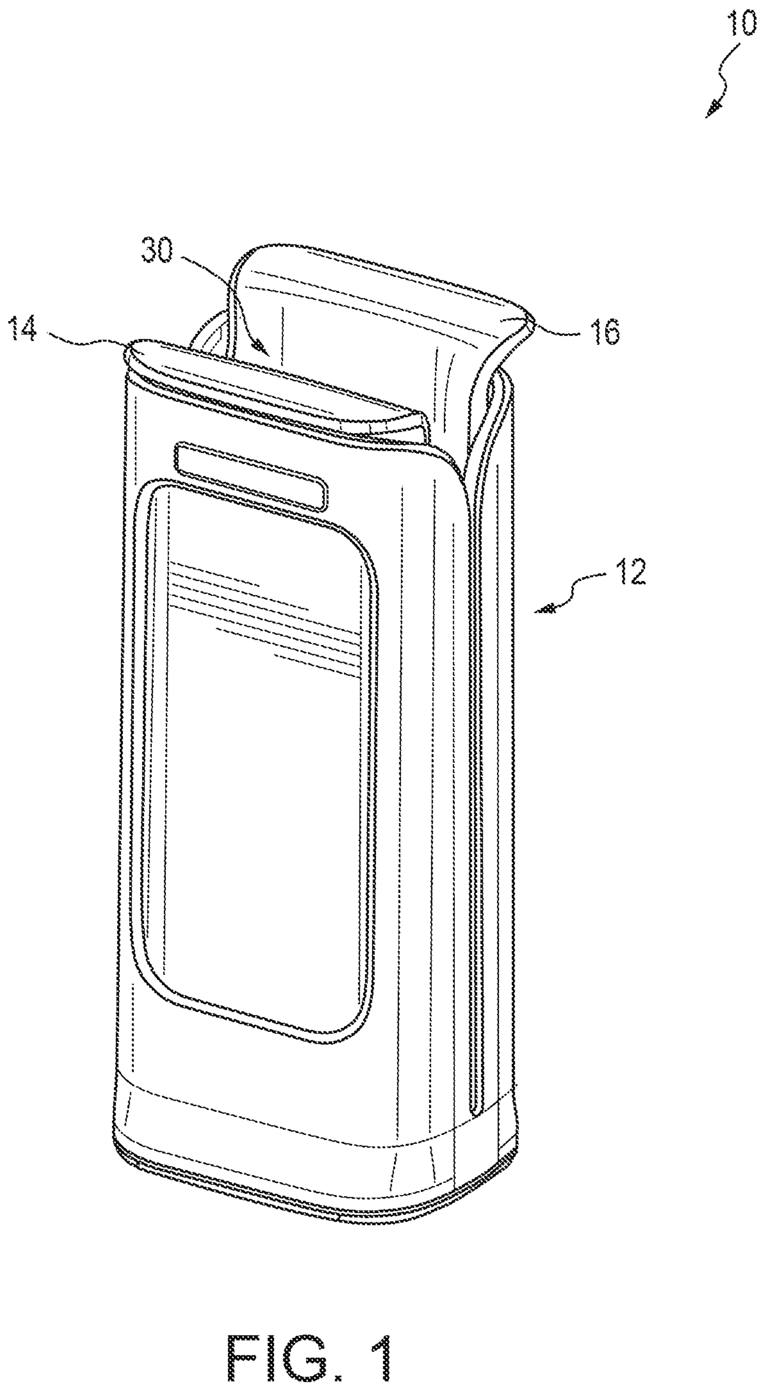
FIG. 1 is a perspective view of a slicing guide.
Figure 2:
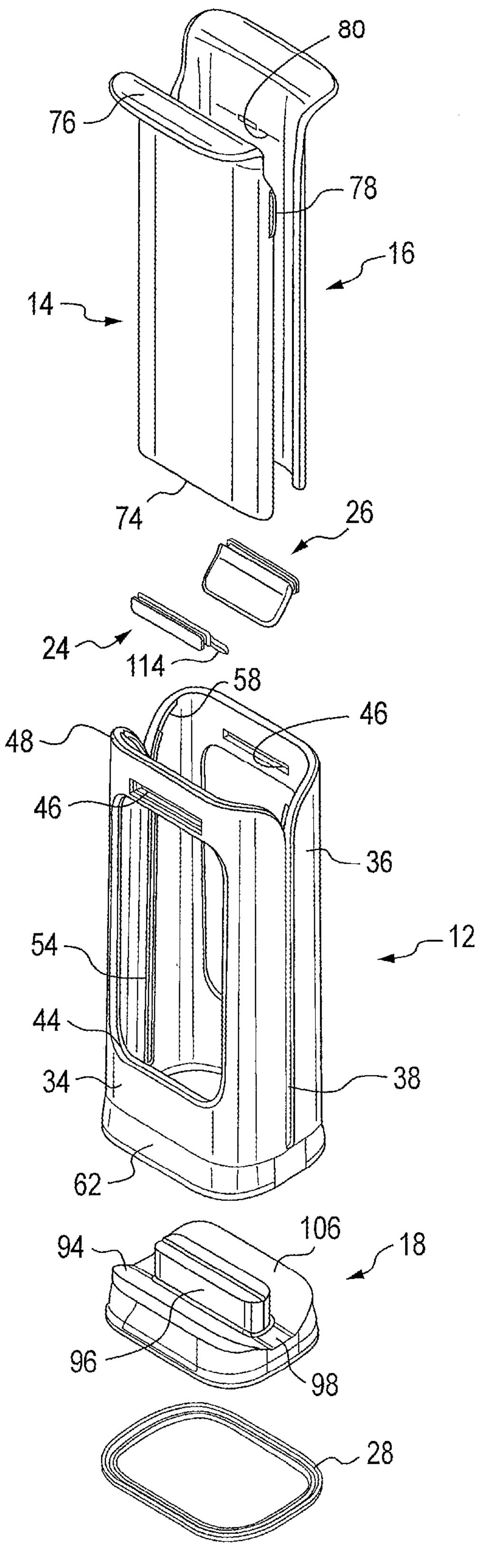
FIG. 2 is an exploded view of the slicing guide depicted in FIG. 1.
Figure 3:
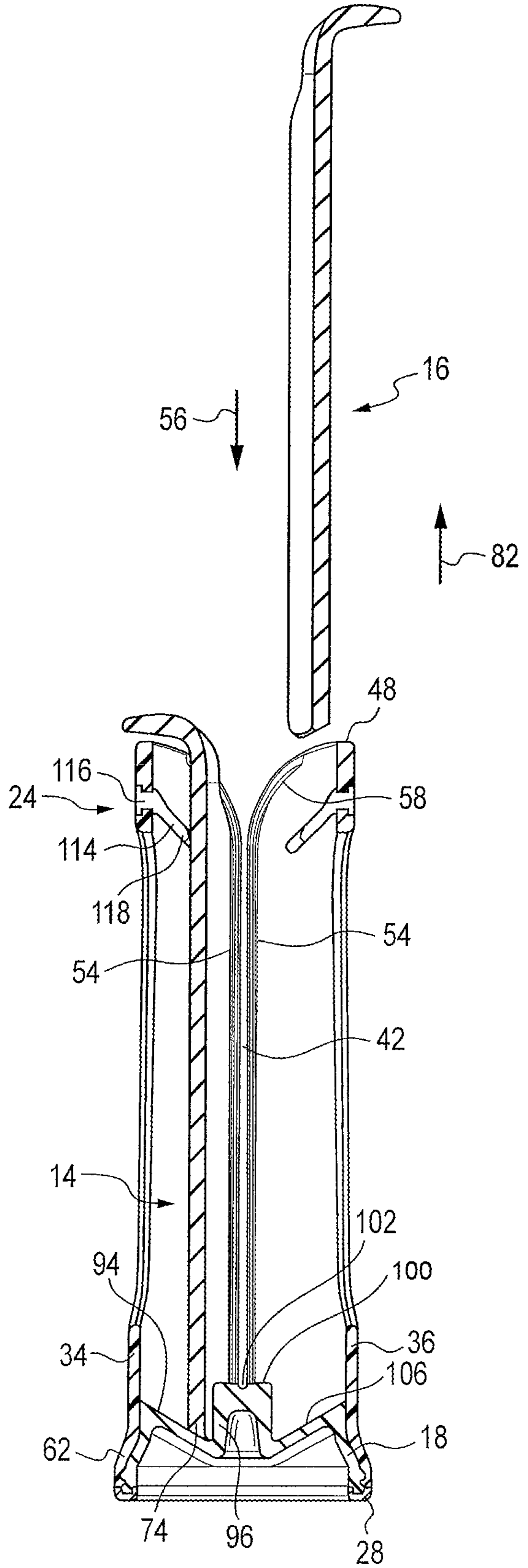
FIG. 3 is a side cross-sectional view of the slicing guide depicted in FIG. 1 with a door removed from a shell of the slicing guide.
Figure 4:
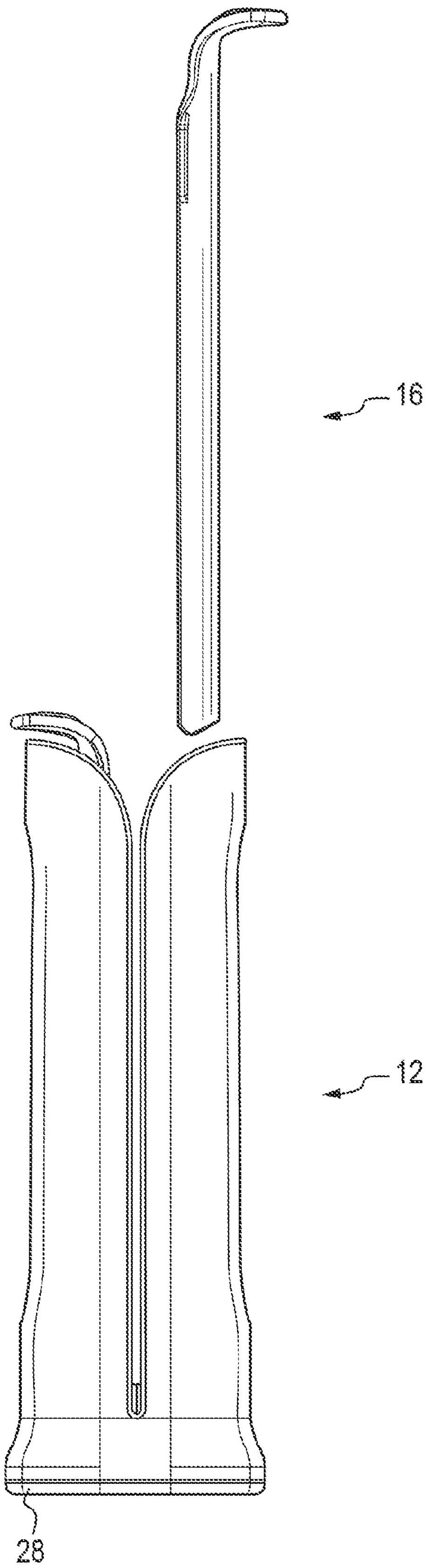
FIG. 4 is a side view of the slicing guide depicted in FIG. 1 in the orientation shown FIG. 3.

With reference to FIG. 1, a slicing guide 10 includes a shell 12 and a first door 14 received in the shell. The illustrated slicing guide 10 also includes a second door 16 that is also received in the shell 12. With reference to FIG. 2, the slicing guide 10 also includes a base 18. The base 18 is connected with the shell 12, as can be seen in FIG. 3. The slicing guide 10 also includes a first spring 24 and a second spring 26 that each connect with the shell 12. The slicing guide 10 also includes a foot ring 28 that connects with the base 18, which is made from a resilient material that inhibits movement of the slicing guide 10 on a table or countertop during use. The slicing guide 10 is useful in cutting multiple items that are loaded into a compartment 30. The slicing guide 10 can be useful when cutting a plurality of small items, such as small fruits; however, the slicing guide can be used when cutting other items.

With reference to FIG. 2, the shell 12 includes a first side wall 34 and an opposing second side wall 36. The shell 12 includes a first slot 38 between the first side wall 34 and the second side wall 36. With reference to FIG. 3, the shell 12 also includes a second slot 42 positioned between the first side wall 34 and the second side wall 36. The first slot 38 is aligned with the second slot 42, e.g., each reside in the same vertical plane, and each are configured for receiving a knife used when cutting through items loaded into the compartment 30 (FIG. 1).

The first side wall 34 is a mirror image of the second side wall 36 with respect to the plane that intersects the first slot 38 and the second slot 42. As such, aspects of one of the two side walls 34, 36 will be described with the understanding that the other side wall includes the identical feature in the same location.

The first side wall 34 is generally C-shaped when viewed from above and is generally concave in a direction facing the second side wall 36. Likewise, the second side wall 36 is generally C-shaped when viewed from above and is generally concave in a direction facing the first side wall 34. Each side wall 34, 36 includes a window 44. The windows 44 allow for the user of the slicing guide 10 to view the contents loaded into the compartment 30. Each side wall 34, 36 also includes a slot 46. The slot 46 is formed above the window 44 and is disposed adjacent a top end 48 of each side wall 34, 36. The slot 46 in the first side wall 34 is provided to connect the first spring 24 with the first side wall. The slot 46 in the second side wall 36 is provided to connect the second spring 26 with the second side wall.

Each side wall 34, 36 also includes a respective ridge 54 disposed at each side wall 34 adjacent a respective slot 38, 42. The ridges 54 are generally vertically oriented in the illustrated embodiment. The ridges 54 help guide the doors 14, 16 into the shell 12 when inserting the doors 14, 16 into the shell. The ridges 54 cooperate with a respective door 14, 16 to provide a track in which the door 14, 16 can travel as it is inserted into the shell. With reference to FIG. 3, each ridge 54 terminates near the top end 48 of the respective side walls 34, 36 so as to provide a slot or opening to allow for the insertion of the doors 14, 16. For example, with reference to FIG. 3, the door 16 can be oriented in a vertical manner such as that shown and inserted downwardly in the direction of arrow 56 without coming into contact with the ridge 54 of the second side wall 36. The ridge 54 changes configuration near the top end 48 of each respective side wall 34, 36 to provide a flange 58 (see also FIG. 2) that can cooperate with the doors 14, 16 in a manner described in more detail below.

The shell 12 also includes a base section 62. The base section 62 is formed as a continuous wall having the same thickness as each side wall 34, 36. The base section 62, however, does not include the slots 38, 42 and is uninterrupted around the shell 12. The shell 12 in the illustrated embodiment is made of a molded piece of plastic.

The first door 14 and the second door 16 are also mirror images of one another with respect to the plane intersecting the first slot 38 and the second slot 42. As such, it is to be understood that the description of components and attributes of the first door 14 also applies to the second door 16. Each of the doors 14, 16 are also generally C-shaped when viewed from above and concave in a direction facing each other. In the illustrated embodiment, the doors 14, 16 are made from a translucent or a transparent material, which allows for viewing of the contents loaded inside the compartment 30 (FIG. 1) through the window 44 when the doors 14, 16 are inserted into the shell 12 such as shown in FIG. 1.

Each door 14, 16 has a planar lower end 74. Each door 14, 16 is made of a panel of plastic and includes a flange 76 at an upper end that flares outwardly and away from the shell 12 when properly loaded in the shell. The outwardly flared upper flange 76 facilitates loading of items into the compartment 30 by funneling items that land on the flange toward the compartment. The flange 76 also facilitates removal of each door 14, 16 from the shell 12 and loading of the doors 14, 16 into the shell 12. Each door 14 also includes a detent 78 on each side (only one of which is visible in the figures). The detent 78 cooperates with the flange 58 to provide feedback to an operator that the door 14 has been fully inserted into the shell. When the door 14 is fully inserted into the shell, the detent 78 rides over the flange 58 providing tactile feedback to the operator in the way of vibrations and sound. Visible only on the second door 16 in FIG. 2, each door 14, 16 also includes indicia, which can be a "fill line" mark 80. The indicia can provide an indication to the operator as to how many items can be loaded into the compartment 30.

The first door 14 is received in the shell 12 between the first side wall 34 and the second side wall 36 and is also moveable relative to the shell 12. Similarly, the second door 16 is received in the shell 12 between the first side wall 34 and the second side wall 36, and is also moveable relative to the shell. The first spring 24 contacts the first side wall 34 of the shell 12 and the first door 14 and urges the first door 14 in a direction toward the slots 38, 42. Likewise, the second spring 26 contacts the second side wall 36 of the shell 12 and the second door 16 and urges the second door 16 in the direction toward the slots 38, 42. The first door 14 and the second door 16 are both removably received in the shell 12. The doors 14, 16 can be removed from the shell 12 for cleaning, and also after the cutting operation to more easily unload items that have been cut from the compartment 30 (FIG. 1). In the illustrated embodiment, each of the doors 14, 16 is removable by pulling upwardly in the direction of arrow 82 (FIG. 3).

The base 18 connects with the shell 12 by being received in the shell 12 and surrounded by the base section 62 of the shell. The base 18 can connect with the shell 12 in other conventional manners. The base 18 includes a first base surface 94 sloped downwardly from the first side wall 34 in a direction toward the slots 38, 42. The first door 14 cooperates with the first base surface 94 so that the lower end 74 of the first door 14 is urged in the direction toward the slots 38, 42 when resting on the first base surface 94. Gravity operating in a vertical direction urges the lower end 74 of the first door 14 toward the slots 38, 42.

The base 18 also includes a pedestal 96 extending upwardly from a lower surface 98 of the base 18. The pedestal 96 is centrally located, e.g., with respect to the first side wall 34 and the second side wall 36 of the shell 12, on the base 18. The lower surface 98 is also centrally located on the base 18 with respect to the first side wall 34 and the second side wall 36 of the shell 12. The first base surface 94 slopes downwardly toward the lower surface 98 and the pedestal 96. The pedestal 96 is positioned to preclude further movement of the lower end 74 of the first door 14 in the direction toward the slots 38, 42 when the lower end 74 is in contact with the first base surface 94. As such, the pedestal 96 prevents the first door 14 from moving so as to block the slots 38, 42. The pedestal 96 includes a landing surface 100 offset vertically above the lower surface 98. A notch 102, which is aligned with the slots 38, 42, is provided on the landing surface 100. The notch 102 is provided to receive the knife blade during a cutting operation after the knife blade has passed through the articles loaded into the compartment 30 (FIG. 1).

The base 18 also includes a second base surface 106 sloped downwardly from the second side wall 36 in a direction toward the slots 38, 42. The second door 16 cooperates with the second base surface 106 so that the lower end 74 of the second door 16 is urged in the direction toward the slots 38, 42 when resting on the second base surface 106. The second base surface 106 also slopes downwardly from the second side wall 36 toward the lower surface 98 and the pedestal 96. The pedestal 96 also precludes further movement of the lower end 74 of the second door 16 in the direction toward the slots 38, 42 when the lower end 74 is in contact with the second base surface 106.

The first spring 24 is a mirror image of the second spring 26 with respect to the plane that intersects the slots 38, 42. The first spring 24 will be described with particularity with the understanding that the second spring 26 includes the same components and operates in the same manner.

In the illustrated embodiment, the first spring 24 is a leaf spring that includes a tail 114 extending downwardly and away from the first side wall 34, as seen in FIG. 3. The first spring 24 also includes a block section 116 that is inserted into the slot 46 formed in the first side wall 34 to connect the first spring 24 with the first side wall. The first spring 24 extends downwardly and away from the first side wall 34 to facilitate insertion of the first door 14 into the shell 12. The tail 114 deflects toward the first side wall 34 as the first door 14 is being inserted into the shell 12 in the direction of arrow 56 in FIG. 3. The first spring 24 in the illustrated embodiment is made from a silicone material. The first spring 24 can be made from another resilient material that does not scratch a plastic material when sliding across the plastic material. Since the doors 14, 16 are made from a transparent material, and it is desirable to see the items that are loaded into the compartment 30 to be cut, it can also be desirable to have the springs 24, 26 made from a material that does not scratch the plastic material from which the doors 14, 16 are made. The first door 14 is also moveable relative to a distal end 118 of the first spring 24. When the block section 116 of the first spring 24 is inserted into the slot 46, the first spring 24 is fixed to the shell 12 for movement with the shell. The distal end 118, however, is moveable with respect to the shell 12 and with respect to the first door 14. As such, the first door 14 is removably received in the shell 12 between the first side wall 34 and the second side wall 36. The first spring 24 connects with the shell 12 and urges the first door 14 in a direction toward the second side wall 36 when the first door is received in the shell. The first door 14 is moveable relative to the distal end 118 at the first spring 24 in a direction perpendicular to the direction toward the second door 16, i.e., the first door 14 is moveable relative to the distal end 118 of the first spring 24 in the direction of arrow 56 and arrow 82 in FIG. 3. The first spring 24 connects with the shell 12 adjacent the top end 48 of the first side wall 34. The first spring 24 connects with the first side wall 34 above the window 44. Both the sloped base 18 and the first spring 24 urge the first door 14 toward the second door 16. When contents are loaded into the compartment 30, the lower end 74 of the first door 14 can move upwards along the first base surface 94 and move vertically upward with respect to the distal end 118 of the first spring 24. A resilient force is still being applied to the door 14 by the first spring 24 in the direction of the second door 16, and gravity is urging the lower end 74 of the first door 14 toward the second door 16 when there are contents loaded into the compartment 30. The second door 16 operates in a similar manner with the second spring 26 as the first door 14 and the first spring 24. As such, further description thereof is not provided for the sake of brevity.

In use, an operator inserts the doors 14, 16 into the shell 12. Each door 14, 16 is inserted in the direction of arrow 56 (FIG. 3) until the detents 78 on the doors 14, 16 each ride over a respective flange 58 on the side walls 34, 36 of the shell 12. This results in the lower ends 74 of the doors 14, 16 contacting respective base surfaces 94, 106. The lower ends 74 of the doors 14, 16 are urged by gravity toward the pedestal 96 and the slots 38, 42. Items are then loaded into the compartment 30 between the first door 14 and the second door 16. The first spring 24 urges the first door 14 toward the second door 16. Similarly, the second spring 26 urges the second door 16 toward the first door 14 thus tightly holding the contents loaded into the compartment 30. An operator then passes the knife blade through the compartment and the slots 38, 42 until the knife blade contacts the landing surface 98 within the notch 102. The knife is then extracted from the shell 12. Contents can then be poured from the shell 12, or prior to removal of the contents one of the doors 14, 16 can be removed to make it easier to remove the contents from the shell.

Figure 5:
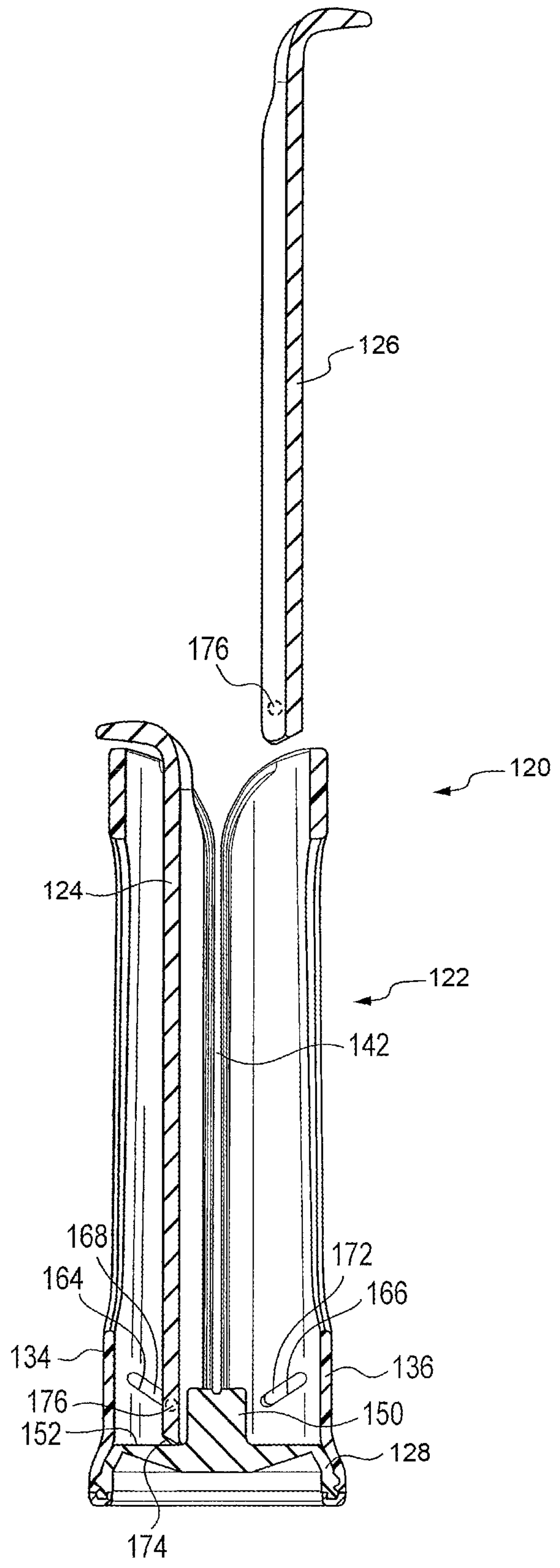
FIG. 5 is a side cross-sectional view of an alternative embodiment of a slicing guide with a door removed from a shell of the slicing guide.

FIG. 5 depicts an alternative slicing guide 120. The slicing guide 120 includes a shell 122 and a first door 124 received in the shell. The illustrated slicing guide 120 also includes a second door 126 that is receivable in the shell 122. The slicing guide 120 also includes a base 128 connected with the shell 122. The slicing guide 120 is similar to the slicing guide 10 described above, and the differences between the slicing guide 120 depicted in FIG. 5 and the slicing guide 10 described above will be highlighted.

The slicing guide 120 does not include springs like the embodiment discussed above. The operator can squeeze the first door 124 and the second door 126 together while cutting to retain the items between the doors 124, 126. The shell 122 includes a first side wall 134 and an opposing second side wall 136, and slots 142 (only one of which is visible in FIG. 5) positioned between the first side wall 134 and the second side wall 136. The base 128 also includes a pedestal 150, which is similar to the pedestal 96, extending upwardly from a lower surface 152 of the base 128. The lower surface 152 is flat.

The shell 122 includes a downwardly sloped surface (two downwardly sloped surfaces 164 and 166 are depicted in FIG. 5) that cooperate with the doors 124, 126 to urge a lower end 174 of each door in the direction toward the slot 142 when resting on the downwardly sloped surface. As illustrated in FIG. 5, each downwardly sloped surface 164, 166 is formed in or on the shell 122 by a respective slot or recess 168, 172. Each door 124, 126 includes a bump 176 that is receivable in the slot or recess 168, 172. The bump 176 can move within the slot or recess 168, 172. Gravity operating in a vertical direction urges the lower end 174 of each first door 124, 126 toward the slot 42 as the bump 176 moves within the slot or recess 168, 172.

Slicing guides have been described above with particularity. Modifications and alterations will occur to those upon reading and understanding the preceding detailed description. The invention is not limited to only the embodiments described above. Instead, the invention is broadly defined by the appended claims and the equivalents thereof. Moreover, aspects from one embodiment can be employed in the other embodiment. Also, the use of the terms "first," "second" and the like do not denote any order or importance; these terms are only used to distinguish one element from another. It will also be appreciated that that various presently unforeseen or unanticipated alternatives, modifications, variations or improvements therein may be subsequently made by those skilled in the art which are also intended to be encompassed by the following claims.

The invention claimed is:

1. A slicing guide comprising:

a shell including a first side wall and an opposing second side wall, the shell including a slot positioned between the first side wall and the second side wall for receiving a knife;

a first door received in the shell between the first side wall and the second side wall and movable relative to the shell; and a base connected with the shell, wherein at least one of the base and the shell includes a downwardly sloped surface sloped downwardly from the first side wall in a direction toward the slot, wherein the first door cooperates with the downwardly sloped surface so as to urge a lower end of the first door in the direction toward the slot when resting on the downwardly sloped surface.

2. The slicing guide of claim 1, wherein the base includes a pedestal extending upwardly from a lower surface, and the downwardly sloped surface is a first base surface that slopes downwardly toward the lower surface and the pedestal.

3. The slicing guide of claim 2, wherein the pedestal is positioned to preclude further movement of the lower end of the first door in the direction toward the slot when the lower end is in contact with the first base surface.

4. The slicing guide of claim 2, wherein the pedestal includes a landing surface offset from the lower surface and a notch, which is aligned with the slot, is provided in the landing surface.

5. The slicing guide of claim 1, wherein the downwardly sloped surface is formed in or on the shell.

6. The slicing guide of claim 5, wherein the downwardly sloped surface is formed by a slot or recess.

7. The slicing guide of claim 1, further comprising a first spring contacting the shell and the first door and urging the first door in the direction toward the slot.

8. The slicing guide of claim 7, wherein the first door is movable relative to a distal end of the first spring.

9. The slicing guide of claim 1, further comprising a second door received in the shell between the first side wall and the second side wall, wherein the downwardly sloped surface is a first downwardly sloped surface and at least one of the base and the shell includes a second downwardly sloped surface sloped downwardly from the second side wall in a direction toward the slot, wherein the second door cooperates with the second downwardly sloped surface so as to urge a lower end of the second door in the direction toward the slot when resting on the second downwardly sloped surface.

10. A slicing guide comprising:

a shell including a first side wall and an opposing second side wall, the shell including a slot positioned between the first side wall and the second side wall for receiving a knife;

a first door received in the shell between the first side wall and the second side wall and movable relative to the shell; and a first spring contacting the first side wall of the shell and the first door, the first spring urging the first door in a direction toward the second side wall, wherein the first door is movable relative to a distal end of the first spring.

11. The slicing guide of claim 10, wherein the first door is movable relative to the distal end of the first spring in a direction perpendicular to the direction toward the second side wall.

12. The slicing guide of claim 10, wherein the first spring connects with the shell adjacent a top end of the first side wall.

13. The slicing guide of claim 12, wherein the first side wall includes a window, and the first spring connects with the first side wall above the window.

14. The slicing guide of claim 12, further comprising a base connected with the shell and including a first base surface sloped downwardly from the first side wall in a direction toward the second side wall, wherein a lower end of the first door is urged in the direction toward the second side wall when in contact with the first base surface.

15. The slicing guide of claim 10, wherein the first spring is a leaf spring made from a resilient material that does not scratch a plastic material when sliding across the plastic material.

16. The slicing guide of claim 10, further comprising:

a second door received in the shell between the first side wall and the second side wall; and a second spring connected with the shell and urging the second door in a direction toward the first door, wherein the second door is movable relative to a distal end of the second spring.

17. A slicing guide comprising:

a shell including a first side wall and an opposing second side wall, the shell including a slot positioned between the first side wall and the second side wall for receiving a knife;

a first door removably received in the shell between the first side wall and the second side wall and movable relative to the shell when received in the shell; and a first spring contacting the first side wall of the shell and the first door, the first spring urging the first door in a direction toward the second side wall when the first door is received in the shell.

18. The slicing guide of claim 17, wherein the first spring is a leaf spring made from a resilient material that does not scratch a plastic material when slid across the plastic material.

19. The slicing guide of claim 17, wherein the first spring is a leaf spring and includes a tail extending downwardly and away from the first side wall.

20. The slicing guide of claim 17, further comprising:

a second door removably received in the shell between the first side wall and the second side wall and movable relative to the shell when received in the shell; and a second spring connected with the shell and urging the second door in a direction toward the first side wall when the second door is received in the shell.

* * * * *